(12) United States Patent
Bushmire et al.

(10) Patent No.: US 9,701,802 B2
(45) Date of Patent: Jul. 11, 2017

(54) REINFORCED UV-A CURABLE COMPOSITE COMPOSITIONS AND METHODS

(75) Inventors: Alan D. Bushmire, McDonald, PA (US); Jan L. Clatty, Moon Township, PA (US); Michael J. Dvorchak, Monroeville, PA (US); Charles A. Gambino, McDonald, PA (US); Christine Mebane, Braddock, PA (US)

(73) Assignee: ALLNEX IP S.a.r.L., Luxembourg (LU)

( * ) Notice: Subject to any disclaimer, the term of this patent is extended or adjusted under 35 U.S.C. 154(b) by 2016 days.

(21) Appl. No.: 12/420,112

(22) Filed: Apr. 8, 2009

(65) Prior Publication Data
US 2010/0260941 A1     Oct. 14, 2010

(51) Int. Cl.
C08J 7/04       (2006.01)
C08J 5/24       (2006.01)
C08J 7/12       (2006.01)
B29C 35/08      (2006.01)

(52) U.S. Cl.
CPC ............. *C08J 5/24* (2013.01); *C08J 7/123* (2013.01); *B29C 2035/0827* (2013.01); *C08J 2375/16* (2013.01)

(58) Field of Classification Search
CPC .................. B29C 2035/0827; C08J 7/123
USPC ................................... 427/515, 520
See application file for complete search history.

(56) References Cited

U.S. PATENT DOCUMENTS

| | | | |
|---|---|---|---|
| 4,188,472 A | 2/1980 | Chang | |
| 4,340,497 A | 7/1982 | Knopf | |
| 5,777,024 A | 7/1998 | Killilea et al. | |
| 6,306,504 B1 | 10/2001 | Meixner et al. | |
| 6,465,539 B1 | 10/2002 | Weikard et al. | |
| 6,534,128 B1 | 3/2003 | Carlson et al. | |
| 6,538,044 B2 | 3/2003 | Ledniczky et al. | |
| 6,621,970 B2 * | 9/2003 | Khudyakov et al. | 385/128 |
| 7,144,544 B2 | 12/2006 | Bulluck et al. | |
| 7,268,172 B2 | 9/2007 | Bach et al. | |
| 7,276,542 B2 | 10/2007 | Bulluck et al. | |
| 7,291,656 B2 | 11/2007 | Bulluck et al. | |
| 7,291,657 B2 | 11/2007 | Bulluck et al. | |

(Continued)

FOREIGN PATENT DOCUMENTS

| JP | 05032747 A | 2/1993 |
|---|---|---|
| JP | 2001072924 A | 3/2001 |

(Continued)

*Primary Examiner* — Jie Yang
(74) *Attorney, Agent, or Firm* — Drinker Biddle & Reath LLP

(57) ABSTRACT

The present disclosure is directed to a process for forming a reinforced ultraviolet (UV) radiation-curable composite. The composite may be formed by applying reinforcing layers and resin layers to a substrate. The resin composition may include an aliphatic urethane acrylate oligomer, a polyfunctional acrylate monomer, and a photoinitiator. The composite formed on the substrate may be exposed to UV radiation to cure the composite on the substrate. The composite may be characterized in that it is cured within 10 minutes of exposure to UV radiation and does not exhibit oxygen inhibition effects, such as, for example, surface tack. The reinforced UV-curable composite may find utility, for example, as a rapid field repair patch in aerospace applications, among others.

18 Claims, 13 Drawing Sheets

(56) References Cited

U.S. PATENT DOCUMENTS

| | | |
|---|---|---|
| 7,294,656 B2 | 11/2007 | Bach et al. |
| 7,714,976 B2 | 5/2010 | Shimodaira et al. |
| 2003/0059555 A1 | 3/2003 | Fenn et al. |

FOREIGN PATENT DOCUMENTS

| | | |
|---|---|---|
| WO | 9704881 | 2/1997 |
| WO | 9746627 | 12/1997 |
| WO | 9906888 | 2/1999 |
| WO | 03027162 A1 | 4/2003 |

\* cited by examiner

REINFORCED UV-A CURABLE COMPOSITE COMPOSITIONS AND METHODS

TECHNICAL FIELD

The present disclosure is directed to reinforced ultraviolet (UV) radiation-curable composites and processes for forming reinforced UV curable composites.

BACKGROUND

UV curable coatings are one of the fastest growing sectors in the coatings industry. In recent years, UV technology has made inroads into a number of market segments like fiber optics, optical- and pressure-sensitive adhesives, automotive applications like UV cured topcoats, and UV curable powder coatings. The driving force of this development is mostly the quest for an increase in productivity of the coating and curing process. In various applications where minor and major repairs need to be performed swiftly and at ambient temperature on various substrates, UV technology promises to significantly increase the speed and integrity of repairs. Safety concerns associated with the use of UV lamps as well as economic constraints may likely preclude the use of high intensity light sources. Relatively inexpensive low intensity lamps that emit only in the UV-A region of the electromagnetic spectrum are taking their place, thus posing new challenges to resin developers and formulators.

UV curable coating compositions are known in the art. See, e.g., U.S. Pat. Nos. 4,188,472; 4,340,497; 6,465,539; and 6,534,128; and published PCT applications WO-97/04881 and WO-03/027162, each of which is incorporated by reference herein. In addition, U.S. Pat. No. 5,777,024 (incorporated by reference herein) is directed to the reaction product of a low viscosity isocyanurate group-containing polyisocyanate, which has been modified with allophanate groups to reduce its viscosity, with hydroxyl-functional olefinic compounds such as hydroxyalkyl (meth)acrylates and lactone modified versions of these (meth)acrylates. U.S. Pat. No. 6,306,504 (incorporated by reference herein) is directed to a coating composition for polycarbonate which contains the reaction product of a low viscosity polyisocyanate, such as a low viscosity isocyanurate group-containing polyisocyanate, with a hydroxy acrylate.

Various other UV curable coating compositions are also known in the art. See, in addition, U.S. Pat. Nos. 6,538,044; 7,294,656; and U.S. Patent Application Publication 2003/0059555, each of which is incorporated by reference herein.

SUMMARY

Various embodiments disclosed herein are directed to UV-A curable composites. The composites may comprise a resin combined with a reinforcing material. The resin may comprise an aliphatic urethane acrylate oligomer, a polyfunctional acrylate monomer, and a photoinitiator. The composites are characterized in that they are cured within 10 minutes exposure to UV-A radiation.

Other embodiments disclosed herein are directed to processes for forming reinforced composites. The composites may be formed on a substrate by applying at least one reinforcing layer and at least one resin layer. The resin may comprise a urethane acrylate oligomer, a polyfunctional acrylate monomer, and a photoinitiator. The composite may be exposed to UV-A radiation, and cured within 10 minutes of the exposure.

It is understood that the invention is not limited to the embodiments disclosed in this Summary, and is intended to cover modifications that are within the spirit and scope of the invention as defined by the claims.

BRIEF DESCRIPTION OF THE DRAWINGS

The characteristics and advantages of the present disclosure may be better understood by reference to the accompanying figures, in which.

DETAILED DESCRIPTION

Figure 1:
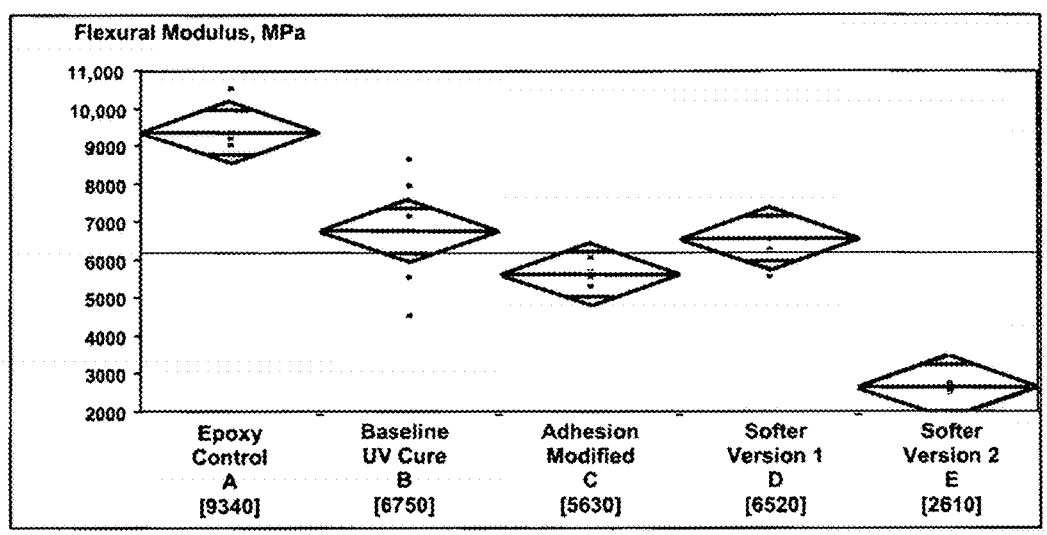
FIG. 1 is a graph presenting comparative initial flexural modulus data for composites according to embodiments disclosed herein.

In the present disclosure, including the claims, other than where otherwise indicated, all numbers expressing quantities or characteristics are to be understood as being prefaced and modified in all instances by the term "about." Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Any patent, publication, or other disclosure material, in whole or in part, that is said to be incorporated by reference herein, is incorporated herein in its entirety, but only to the extent that the incorporated material does not conflict with existing definitions, statements, or other disclosure material explicitly set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

The embodiments disclosed herein are directed to reinforced UV curable composites and processes for forming reinforced UV curable composites. In various embodiments, the composites may comprise a resin combined with a reinforcing material. The resin may comprise a urethane acrylate oligomer, a polyfunctional acrylate monomer, and a photoinitiator. The disclosed composites are characterized in that they are cured within 10 minutes exposure to UV-A radiation. In various embodiments, the disclosed composites may be cured within 8 minutes exposure to UV-A radiation.

As used herein, the term "cure" and variations thereof used in connection with a composition (e.g., "a cured composite") shall mean that any crosslinkable or co-reactive components of the composition are at least partially crosslinked or co-reacted such that the resin portion of the composition becomes solidified. In certain embodiments of the disclosed composites and processes, the crosslink density of the crosslinkable components, i.e., the degree of crosslinking, ranges from 35% to 100% of complete crosslinking. In other embodiments, the crosslink density ranges from 50% to 95% of full crosslinking. In other embodiments, the crosslink density ranges from 65% to 85% of full crosslinking. Persons skilled in the art will understand that the presence and degree of crosslinking, and therefore the crosslink density, can be determined by a variety of methods known in the art.

The disclosed composites may comprise a reinforcing material, such as, for example, fiberglass. In various embodiments, style 7781 E-glass is used as a reinforcing material. Reinforcing materials that find utility in the disclosed composites include, but are not limited to, fiberglass, Kevlar®, graphite, and mixtures of any thereof. In various embodiments, the reinforcing material may be in the form of a woven or non-woven mat or fabric. For example, plain weaves, chopped strand mats and continuous random fiber mats find utility in the composites and processes disclosed herein. In various other embodiments, the reinforcing material may be in the form of randomly oriented or non-randomly oriented, unassociated fibers embedded in the resin.

The disclosed composites may comprise a resin. In various embodiments, the resin may comprise a urethane acrylate oligomer. The urethane acrylate oligomer may comprise an aliphatic urethane acrylate oligomer, such as, for example, a reaction product of an aliphatic polyisocyanate and a hydroxy-functional acrylate. The aliphatic polyisocyanate may comprise at least one functional group, such as, for example, isocyanurate, iminooxadiazine dione, urethane, uretdione, allophanate, biuret, carbodiimide, and combinations of any thereof. The hydroxy-functional acrylate may comprise a hydroxyalkyl ester of (meth)acrylic acid, a reaction product of a lactone and a hydroxyalkyl ester of (meth)acrylic acid, or a combination of any thereof. Additional hydroxy-functional acrylates that may find utility in the disclosed processes and composites are disclosed, for example, in U.S. Pat. Nos. 7,268,172 and 7,294,656, the disclosures of which are incorporated by reference herein. In various embodiments, the urethane acrylate oligomer comprises a combination of at least two different aliphatic urethane acrylate oligomers. Urethane acrylate oligomers finding utility in the composites and processes disclosed herein are described, for example, in U.S. Pat. Nos. 7,268,172 and 7,294,656.

In various embodiments, the resin may comprise a polyfunctional acrylate monomer. As used herein, the term "polyfunctional acrylate monomer" refers to a chemical moiety comprising two or more acrylate functional groups. The polyfunctional acrylate monomer may function as a reactive diluent or non-solvent thinner in the resin, which may be used to reduce the viscosity of the uncured resin while simultaneously reducing or eliminating the need for conventional solvents. Polyfunctional acrylate monomers finding utility in the composites and processes disclosed herein include, but are not limited to, di-, tri-, and tetra (meth)acrylates. As used herein, the term "(meth)acrylate"—alone or as part of a larger chemical moiety—refers to either an acrylate or a methacrylate group. By way of example, the term "hexanediol di(meth)acrylate" refers to both hexanediol diacrylate and hexanediol dimethacrylate. Polyfunctional acrylate monomers finding utility in the composites and processes disclosed herein include acrylates and methacrylates, for example.

(Meth)acrylates finding utility in the composites and processes disclosed herein include, for example, ethylene glycol di(meth)acrylate; dipropylene glycol diacrylate; hexanediol di(meth)acrylate; triethylene glycol di(meth)acrylate; tetraethylene glycol di(meth)acrylate; trimethylolpropane tri(meth)acrylate; ethoxylated trimethylolpropane tri(meth)acrylate; glycerol tri(meth)acrylate; pentaerythritol tri(meth)acrylate; pentaerythritol tetra(meth)acrylate; neopentylglycol di(meth)acrylate; isobornyl(meth)acrylate and mixtures of any thereof. Additional (meth)acrylates that may find utility in the disclosed processes and composites are disclosed, for example, in U.S. Pat. No. 7,294,656 (incorporated by reference herein).

In various embodiments, the resin may comprise a photoinitiator. A variety of photoinitiators may be utilized in the composites and processes disclosed herein. Photoinitiators typically generate free radicals when exposed to electromagnetic radiation energy. Photoinitiators finding utility in the composites and processes disclosed herein include, for example, 2,2-diethoxyacetophenone; 2- or 3- or 4-bromo-acetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene; 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; and mixtures of any thereof.

Examples of photoinitiators commercially available from Ciba® Specialty Chemicals, and finding utility in the composites and processes disclosed herein, include, but are not limited to, Irgacure® 184 (1-hydroxy-cyclohexyl-phenyl-ketone); Irgacure® 819 (bis(2,4,6-trimethylbenzoyl)-phenylphosphine oxide); Irgacure® 1850 (a 50/50 mixture of bis(2,6-dimethoxybenzoyl)-2,4,4-trimethylpentyl-phosphine oxide and 1-hydroxy-cyclohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1[4-(methylthio)phenyl]-2-morpholonopropan-1-one); Irgacure® 2020; Irgacure® 2022; Darocur® MBF (a phenyl glyoxylic acid methyl ester); and Darocur® 4265 (a 50/50 mixture of bis(2,4,6-trimethylbenzoyl)-phenylphosphine-oxide and 2-hydroxy-2-methyl-1-phenyl-propan-1-one). The foregoing lists are meant to be illustrative only and are not meant to exclude any suitable photoinitiators known to persons skilled in the art. Persons skilled in the art will know—or readily be capable of determining without undue experimentation—the concentrations at which photoinitiators are effectively employed in the disclosed composites and processes, and generally the concentration will not exceed about 10% by weight of the resin.

Photoactivators can be used in combination with the afore-mentioned photoinitiators and synergistic effects may sometimes be achieved when such combinations are used. Photoactivators known in the art include, for example, methylamine, tributylamine, ethyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxy-propane, and combinations of any thereof thereof.

In various embodiments, the resin may comprise an additive. In various embodiments, an additive may comprise a silane acrylate. Silane acrylates finding utility in the composites and processes disclosed herein include, but are not limited to, gamma-methacryloxypropyltrimethoxy silane. In various embodiments, the resin may comprise Silquest® A-174 silane acrylate available from Momentive Performance Materials, Inc.

Additional components and additives that may find utility in the resin portion of the composites disclosed herein are described, for example, in U.S. Pat. Nos. 7,268,172 and 7,294,656 (incorporated by reference herein).

Resins finding utility in the composites and processes disclosed herein may comprise, based on total weight of resin, from 30% to 75% urethane acrylate oligomer, from 5% to 70% polyfunctional acrylate monomer, and from 3% to 9% photoinitiator. The resins may also comprise from 5% to 10% silane acrylate based on total resin weight. In other embodiments, the resins may comprise, based on total weight of resin, from 60% to 75% urethane acrylate oligomer, from 9% to 15% polyfunctional acrylate monomer, from 7% to 9% photoinitiator, and optionally from 7% to 9% silane acrylate. The weight percentages of additional components and additives to the resins finding utility in the disclosed composites and processes may be readily determined without undue experimentation by persons having ordinary skill in the art based, at least in part, on the identity and purpose of the additive.

In certain embodiments, the resin may comprise two or more different aliphatic urethane acrylate oligomers. The resin may comprise, based on total weight of resin, from 17% to 55% of a first urethane acrylate oligomer, from 17% to 55% of a second urethane acrylate oligomer, from 9% to 15% polyfunctional acrylate monomer, from 7% to 9% photoinitiator, and optionally from 7% to 9% silane acrylate. The first urethane acrylate oligomer or the second urethane acrylate oligomer may comprise an aliphatic urethane acrylate oligomer that imparts flexibility to the cured composite. For example, Desmolux® XP 2513 (Bayer Material Science LLC) is a commercially available aliphatic urethane acrylate oligomer that imparts flexibility to cured composites. The other urethane acrylate oligomer may comprise an aliphatic urethane acrylate oiigomer that imparts rigidity and hardness to the cured composite. For example, Desmolux®VP LS 2308 (Bayer Material Science LLC) is a commercially available aliphatic urethane acrylate oligomer that imparts rigidity and hardness to cured composites. In various embodiments, various properties of both the un-cured and cured composites may be engineered, at least in part, by the selection and relative proportions of the respective aliphatic urethane acrylate oligomers in multi-component resins.

The resins may be made by mixing together the respective ingredients using any suitable technique. For example, in a one step approach, all of the resin ingredients are combined and blended, stirred, milled, or otherwise mixed to form a homogeneous composition. As another alternative, certain resin components may be blended together in a first step. Then, in one or more additional steps, any or all additional components may be incorporated into the resin via blending, milling, or other mixing technique.

In various embodiments, the composite may comprise at least one layer of reinforcing material embedded in the resin. The composite may comprise a plurality of alternating layers of reinforcing material and resin. In various embodiments, the composite may comprise at least 2 layers of reinforcing material, in other embodiments at least 5 layers of reinforcing material, and in other embodiments at least 7 or 10 layers of reinforcing material. In various embodiments, the composite may comprise reinforcing material dispersed throughout the resin.

In certain embodiments, the processes disclosed herein may comprise applying to a substrate at least one reinforcing layer and at least one resin layer to form a composite, exposing the composite to UV-A radiation, and curing the composite within 10 minutes of exposure to UV-A radiation. In various embodiments, the composite may be cured within 8 minutes exposure to UV-A radiation. In other embodiments, the processes comprise combining a resin and a reinforcing material to form a composite and exposing the composite to UV-A radiation to cure the composite within 10 minutes exposure to the UV-A radiation.

In various embodiments, the application of reinforcing material and resin to a substrate may be performed using a lay-up procedure. For example, when using woven or non-woven reinforcing fabric (for example, fiberglass mat or Kevlar® fabric), a layer of fabric may be saturated with resin and rolled out onto a substrate to remove any entrapped air bubbles or wrinkles in the reinforcing mat. Additional layers may be saturated with resin, laid out and rolled in an analogous manner. This procedure may be repeated until a desired number of reinforcing layers (for example, in various embodiments, at least 2, 5 or 10 layers) are embedded in a continuous resin matrix. The result is an un-cured composite comprising at least one layer of reinforcing fabric embedded in at least one layer of resin. In various embodiments, an amount of resin may be placed in between the fabric, resulting in a plurality of alternating reinforcing layers and resin layers.

In other embodiments, the composite may be formed by dispersing reinforcing fibers in the resin to form a composite. Examples of fibers finding utility in the disclosed composites and processes include, but are not limited to, glass fibers, aramid Kevlar® fibers, graphite, and chopped mat.

The un-cured dispersed-fiber reinforced resin may be applied to a substrate by any suitable application means known in the art.

The composite may be exposed to UV-A radiation. The radiation may have a wavelength of at least 315 nm, and in various embodiments, may have a wavelength of 320 nm to 400 nm. The distance between the composite surface and the radiation source will depend, at least in part, on the spectral overlap of the lamp emission spectrum and the photoinitiator absorption spectrum and on the intensity of the lamp. The length of time the composite is subjected to the radiation will depend, at least in part, on the spectral overlap of the lamp emission spectrum and the photoinitiator absorption spectrum, the lamp intensity, the distance from the radiation sources, and the temperature and humidity of the surrounding environment. The exposure time will generally be less than 10 minutes, and in various embodiments, may be shorter than 8 minutes to achieve cure.

As noted above, the composites may be cured using radiation sources having wavelengths of at least 315 nm, and in some embodiments from 320 nm to 400 nm. The radiation can be provided by any suitable source such as UV lamps having reduced infrared emission or UV lamps fitted with filters to eliminate infrared emissions or so-called LEDs (light-emitting devices) emitting radiation in the wavelength noted. Particularly useful commercially available devices include: the Panacol UV H-254 lamp (available from Panacol-Elsol Gmbh—a 250 watt ozone-free, iron doped metal halide lamp with spectral wavelength of 320 nm to 450 nm); the Panacol UVF-450 lamp (320 nm to 450 nm depending on the black, blue or clear filter used); the Honle UVA HAND 250 CUL lamp (available from Honle UV America Inc—emitting maximum intensity UVA range of 320 nm to 390 nm); the PMP 250 watt metal halide lamp (available from Pro Motor Car Products Inc); the Con-Trol-Cure—UV LED Cure-All 415 lamp (available from UV Process Supply Inc.—spectral wavelength of 415 nm with a 2.5 to 7.95 W operating wattage range); the Con-Trol-Cure—UV LED Cure-All 390 lamp (also available from UV Process Supply Inc.—spectral wavelength of 390 nm with a 2.76 to 9.28 W operating wattage range); the UV H253 UV lamp (available from UV Light Technologies—the unit contained a 250 W iron doped metal halide lamp fitted with a black glass filter to produce a spectral wavelength of between 300 and 400 nm); and the Cure-Tek UVA-400 (available from H&S Autoshot—the lamp has a 400-watt metal halide bulb and the lamp assembly can be fitted with different filters to control or eliminate the visible and infra-red radiation).

In various embodiments, the composites disclosed herein achieve cure within 10 minutes exposure to UV-A radiation when the radiation source is positioned at least 8 inches away from the composite. In other embodiments, the composites achieve cure within 8 minutes exposure to UV-A radiation when the radiation source is positioned at least 8 inches away from the composite. In other embodiments, the composites achieve cure within 10 minutes exposure to UV-A radiation when the radiation source is positioned at least 10 inches away from the composite. In other embodiments, the composites achieve cure within 8 minutes exposure to UV-A radiation when the radiation source is positioned at least 10 inches away from the composite.

The composites disclosed herein possess properties comparable to conventional composite systems, such as, for example fiberglass-reinforced epoxy systems. However, the composites disclosed herein are capable of being rapidly cured in a time period on the order of minutes using the less energetic UV-A portion of the UV electromagnetic spectrum. In contrast, epoxy systems generally require curing periods on the order of days, and require the application of substantial heat energy to accelerate cure to periods on the order of hours. In addition, the use of only the UV-A portion of the full UV spectrum is safer and poses less health risks for individuals working with the composites.

In certain embodiments, the composites disclosed herein possess an additional advantage in that they do not exhibit surface interference due to oxygen inhibition. UV curable resins based in acrylate monomers and oligomers generate cross-linked polymers by photoinitiated radical polymerization. The free radicals formed by the photolysis of the initiator, or present on the active end of a growing polymer chain, may be rapidly scavenged by molecular oxygen molecules to yield peroxyl radicals. These species are not reactive towards acrylate double bonds, and therefore, generally do not initiate or propagate radical polymerization reactions. In fact, peroxyl radicals are thought to abstract hydrogen atoms from polymer backbones to generate hydroperoxides, thereby inactivating the initiator or resulting in premature chain termination. This may have an adverse effect on the properties of the resin.

The adverse effects of oxygen inhibition are particularly pronounced at the interfacial surface between a curable resin and air, where the concentration of molecular oxygen may be at its highest levels and where the oxygen may substantially interfere with cure at the surface. The result is often a partially cured resin that possesses substantial surface tack. As used herein, the term "tack" means a state of incomplete cure at a resin surface, characterized in that the resin material at the surface is still in an un-solidified state.

A number of approaches have been employed to minimize or eliminate oxygen inhibition and surface tack. For example, resin formulations have been modified to increase the amounts of photoinitiator and/or shorter wavelength (more energetic) UV radiation (UV-B, UV-C) has been used. In addition, techniques to displace or remove molecular oxygen have been used, such as, for example, curing under a nitrogen or carbon dioxide atmosphere and vacuum bagging.

In various embodiments, the composites disclosed herein comprising a resin combined with a reinforcing material do not exhibit surface interference due to oxygen inhibition, and therefore, do not require the creation of a vacuum or oxygen-free atmosphere across the composite in order to achieve cure without surface tack or other adverse effects. In addition, in various embodiments, the composites disclosed herein may be cured at room temperature within 8 or 10 minutes of exposure using a 315 nm-400 nm UV-A radiation source positioned 8 to 10 inches from the surface of the composite, without using vacuum bagging techniques or an oxygen-free atmosphere, and the resulting cured composites exhibit no tack, voids or other adverse surface interference effects due to oxygen inhibition. The disclosed composites also exhibit minimal or no shrinkage upon cure, which results in good adhesion to various substrates. The resulting cured composites may be immediately sanded and/or overcoated. In contrast, the compositions and methods disclosed in U.S. Pat. Nos. 7,144,544; 7,291,657; 7,291,656; and 7,276,542, do indeed require vacuum bagging techniques to minimize or eliminate surface interference effects due to oxygen inhibition, and furthermore, require at least 20 minutes to cure at room temperature using full spectrum UV light.

In various embodiments, the composite may be applied to a substrate comprising a mold of desired shape, dimensions, surface texture and other properties. The composite applied to a mold may be cured to produce a composite article having a desired shape, dimensions, surface texture, and other properties. In various other embodiments, the composite may be applied to a substrate comprising a damaged substrate or surface, wherein the composite is applied to the substrate and cured to repair the damage. For example, the substrate may comprise a damaged substrate having a hole therein, and the composite may be applied to the substrate to fill the hole and cured, thereby repairing the damage.

The composites disclosed herein may be highly compatible with both porous and nonporous substrates. The compatibility with nonporous materials allows these compositions to be applied onto a wide range of nonporous polymer films, including, but not limited to, polybutylene terephthalate, polyethylene terephthalate, other polyester, polyolefin, polymethyl(meth)acrylate, vinyl acetate, ABS, polyvinyl, polystyrene, high impact polystyrene, polycarbonate, polyurethane, epoxy, polyimide, polyamide, polyamideimide, polyacrylate, polyacrylamide, combinations of any thereof, and the like. In addition, because radiation curing generates little heat, the composites disclosed herein may also be used on heat sensitive substrates, such as, for example, highly thermally-conductive materials like metals. By way of example, the composites and processes disclosed herein find utility as means to conduct rapid repairs of aerospace substrates, such as, for example, aircraft fuselage skins, doors, cowlings, nacelles and the like, which are often aluminum substrates. The disclosed composites and processes also find utility as means to conduct rapid repairs of other substrates, such as, for example, automotive substrates.

In certain embodiments, the disclosed composites may also exhibit strong adhesion to repair or coating substrates and may be highly resistant to delamination. The disclosed composites may also exhibit minimal or no shrinkage upon cure. In other embodiments, the disclosed composites possess an additional advantage in that they are curable through transparent media. For example, a composite comprising at least one reinforcing layer and at least one resin layer may be applied to a substrate having a hole therein. The hole may be damage to the fuselage skin of an aircraft, for example. The composite may be applied to the substrate to fill the hole. A substantially transparent plate (for example, a glass or polycarbonate plate) may be applied to the composite and the substrate such that the plate provides a barrier between the composite-filled hole and the UV-A radiation source. The composite may be exposed to UV-A radiation through the substantially transparent plate and cured. The plate may then be removed from the cured composite, thereby revealing a composite-repaired substrate.

In various embodiments, the transparent plate may be planar, and in other embodiments, the transparent plate may be contoured. In addition, the transparent plate may comprise a texture or pattern. A textured or patterned plate may be used to form a cured composite surface comprising a corresponding texture or pattern.

In various embodiments, the applied composite achieves cure within 10 minutes exposure to UV-A radiation when the radiation source is positioned at least 8 inches away from the transparent plate. In other embodiments, the composite achieves cure within 8 minutes exposure to UV-A radiation when the radiation source is positioned at least 8 inches away from the transparent plate. In other embodiments, the composites achieve cure within 10 minutes exposure to UV-A radiation when the radiation source is positioned at least 10 inches away from the transparent plate. In other embodiments, the composites achieve cure within 8 minutes exposure to UV-A radiation when the radiation source is positioned at least 10 inches away from the transparent plate.

In various embodiments, the disclosed composites may be applied to fill a substantially transparent mold. The composite may be exposed to UV-A radiation through the substantially transparent mold and cured. The mold may then be removed from the cured composite, thereby revealing a molded composite article.

The examples that follow are intended to further describe the embodiments presented herein without restricting their scope. Persons having ordinary skill in the art will appreciate that variations of the Examples are possible within the scope of the invention. All parts and percents are by weight unless otherwise indicated.

EXAMPLES

Example 1

Composites comprising a resin combined with a reinforcing material were prepared. Two resins (Table 1) and 10 reinforcing materials (Table 2) were used to prepare composites according to embodiments disclosed herein. A commercially available epoxy system (Henkel Hysol® EA 9396) was used with the 10 reinforcing materials to prepare controls for comparative purposes.

TABLE 1

| Resin | Component | Composition (weight percent) | Chemical Type | Commercial Name | Supplier |
|---|---|---|---|---|---|
| A | Oligomer | 54.91 | aliphatic urethane acrylate | Desmolux VP LS 2308 | Bayer Material Science LLC |
|   | Oligomer | 18.30 | aliphatic urethane acrylate | Desmolux XP 2513 | Bayer Material Science LLC |
|   | Monomer | 9.15 | mixture of pentaerythritol triacrylate and pentaerythritol tetraacrylate | PETIA | Cytec Industries Inc. |
|   | Photoinitiator | 8.82 | bis(2,4,6-trimethylbenzoyl)-phenylphosphine oxide | Irgacure 2022 | Ciba Specialty Chemicals Inc. |
|   | Additive | 8.82 | gamma-methacryloxypropyltrimethoxy silane | Silquest A-174 | Momentive Performance Materials Inc. |

TABLE 1-continued

| Resin | Component | Composition (weight percent) | Chemical Type | Commercial Name | Supplier |
|---|---|---|---|---|---|
| B | Oligomer | 64.7 | aliphatic urethane acrylate | Desmolux XP 2513 | Bayer Material Science LLC |
|  | Oligomer | — | — | — |  |
|  | Monomer | 27.7 | dipropylene glycol diacrylate | SR 508 | Sartomer Co., Inc. |
|  | Photoinitiator | 2.77 | bis(2,4,6-trimethylbenzoyl)-phenylphosphine oxide | Irgacure 2022 | Ciba Specialty Chemicals Inc. |
|  | Additive | 4.76 | gamma-methacryloxypropyltrimethoxy silane | Silquest A-174 | Momentive Performance Materials Inc. |

TABLE 2

| Mat | Reinforcing Material |
|---|---|
| A | 543 style 7781 E-glass Fiberglass fabric |
| B | 4 ounce plain weave fiberglass mat |
| C | 6 ounce plain weave fiberglass mat |
| D | 10 ounce plain weave fiberglass mat |
| E | ¾ ounce chopped strand fiberglass mat |
| F | 1 ounce chopped strand fiberglass mat |
| G | 2 ounce chopped strand fiberglass mat |
| H | 3 ounce chopped strand fiberglass mat |
| I | 1 ounce continuous random fiber fiberglass mat |
| J | 2 ounce continuous random fiber fiberglass mat |

For each combination of resin and reinforcing material, two composite panels were fabricated using a lay-up process to produce a total of 60 composite panels. Rectangular open-faced molds (6 inch×6 inch×⅛ inch) were used to fabricate composites in order to provide consistent volume and thickness among each composite. The reinforcing material was cut to a rectangular size that approximately matched the 6 inch by 6 inch area of the mold. The resin was prepared by mixing the resin components according to the weight percentages presented in Table 1. A layer of resin was spread on the bottom of the mold. A first layer of reinforcing material was laid over the resin and an additional layer of resin was applied over the reinforcing material. A roller was used to saturate the reinforcing material with resin and to remove entrapped air from the composite. A second layer of reinforcing material was applied and the process repeated to produce an un-cured composite comprising 10 reinforcing layers. A final layer of resin was added to ensure the reinforcing material was encapsulated and embedded in the resin.

The composites comprising Resin A and Resin B were cured for 8 minutes using an H&S Autoshop 400 watt UV-A source at a distance of 10 inches from the composite surface. The cure was performed at ambient room temperature and under natural atmosphere; no vacuum bagging or reduced-oxygen environment was used. The control composites comprising the Henkel Hysol® EA 9396 epoxy system were cured according to the manufacturers instructions. The composites comprising Resin A and Resin B exhibited complete cure with no surface tack or other interference effects due to oxygen inhibition within 8 minutes exposure to UV-A radiation.

Example 2

Composites prepared according to Example 1 were subjected to mechanical testing. The mechanical tests included a three-point bend test (ASTM D790) to determine the flexural strength and flexural modulus of the composites; a tensile test (ASTM D638) to determine the ultimate tensile strength, tensile modulus, and ultimate elongation of the composites; and a hardness test (ASTM D2240) to determine the Shore D hardness of the composites. The apparent density of the composites was also determined (ASTM D 1622). The results of the mechanical testing are presented in Tables 3-5.

TABLE 3

Resin A

| Mat | Specific Gravity (lb/ft3) | Hardness, Shore D @ 1 Sec | Flexural Modulus (MPa) | Tensile Strength @ Break (MPa) | Elongation @ Break (%) | Tensile Modulus (MPa) |
|---|---|---|---|---|---|---|
| A | 1.36 | 76 | 8374 | 94.6 | 0.94 | 11380 |
| B | 1.29 | 76 | 3220 | 66.8 | 1.14 | 6422 |
| C | 1.40 | 77 | 4507 | 63.4 | 0.84 | 7872 |
| D | 1.40 | 76 | 5459 | 66.6 | 0.86 | 8666 |
| E | 1.12 | 74 | 2156 | 48.2 | 1.76 | 3255 |
| F | 1.19 | 77 | 2035 | 39.2 | 2.08 | 2354 |
| G | 1.11 | 77 | 3625 | 68.6 | 1.94 | 4114 |
| H | 1.25 | 80 | 3754 | 82.8 | 2.26 | 4516 |
| I | 0.68 | 74 | 1715 | 30.8 | 1.56 | 2474 |
| J | 1.03 | 75 | 2576 | 38.8 | 1.52 | 3298 |

TABLE 4

Resin B

| Mat | Specific Gravity (lb/ft3) | Hardness, Shore D @ 1 Sec | Flexural Modulus (MPa) | Tensile Strength @ Break (MPa) | Elongation @ Break (%) | Tensile Modulus (MPa) |
|---|---|---|---|---|---|---|
| A | 1.25 | 80 | 2061 | 57.0 | 1.20 | 4938 |
| B | 1.31 | 73 | 1845 | 49.6 | 1.28 | 4085 |
| C | 1.43 | 70 | 1066 | 32.4 | 0.94 | 3964 |
| D | 1.41 | 75 | 1471 | 72.4 | 1.50 | 4838 |
| E | 1.10 | 65 | 1542 | 42.2 | 2.38 | 1987 |
| F | 1.12 | 65 | 1108 | 42.0 | 2.38 | 2139 |
| G | 1.29 | 75 | 3295 | 69.6 | 1.80 | 4502 |
| H | 1.35 | 75 | 2451 | 52.0 | 1.22 | 4774 |

TABLE 4-continued

Resin B

| Mat | Specific Gravity (lb/ft3) | Hardness, Shore D @ 1 Sec | Flexural Modulus (MPa) | Tensile Strength @ Break (MPa) | Elongation @ Break (%) | Tensile Modulus (MPa) |
|---|---|---|---|---|---|---|
| I | 0.79 | 65 | 790.2 | 24.2 | 1.86 | 1470 |
| J | 0.72 | 60 | 1280 | 13.0 | 0.66 | 2427 |

TABLE 5

Hysol EA 9396

| Mat | Specific Gravity (lb/ft3) | Hardness, Shore D @ 1 Sec | Flexural Modulus (MPa) | Tensile Strength @ Break (MPa) | Elongation @ Break (%) | Tensile Modulus (MPa) |
|---|---|---|---|---|---|---|
| A | 1.32 | 72 | 8797 | 187 | 2 | 9978 |
| B | 1.32 | 77 | 5075 | 123 | 2 | 7232.6 |
| C | 1.43 | 74 | 6036 | 140 | 2 | 9486 |
| D | 1.40 | 79 | 8374 | 178 | 2 | 10748 |
| E | 1.26 | 83 | 4304 | 86 | 2 | 5313 |
| F | 1.23 | 80 | 6173.4 | 106 | 2 | 6537 |
| G | 1.15 | 83 | 7820 | 118 | 2 | 8337 |
| H | 1.15 | 86 | 5982 | 98 | 2 | 6919 |
| I | 0.69 | 81 | 1619 | 31 | 2 | 2550 |
| J | 0.70 | 53 | 1893 | 37 | 1 | 3430 |

Example 3

A composite according to embodiments disclosed herein was tested as a repair patch on a polyvinylester (PVE) fiberglass composite substrate. PVE substrate material was obtained from Seeman's Composites and contained a 3/1 coarse, twill weave fiberglass with an approximate weight of 22 ounces. The substrate material was subjected to mechanical testing to determine baseline material properties. The substrate material was damaged by cutting a 3 inch diameter hole into the material. The edges of the hole were tapered inward, sanded, and cleaned of debris.

A lay-up process was used with Mats A and G and Resin A (Tables 1 and 2) to repair the hole. A backing plate was placed behind the damaged substrate to ensure a flat surface in the bottom of the hole. A layer of resin was spread on the bottom and sides of the hole. A first layer of reinforcing material was laid over the resin and an additional layer of resin was applied over the reinforcing material. A roller was used to saturate the reinforcing material with resin and to remove entrapped air from the composite. A second layer of reinforcing material was applied and the process repeated.

The composite comprising Resin A and Mat A had seven (7) reinforcing layers (7-ply composite patch). The composite comprising Resin A and Mat G had four (4) reinforcing layers (4-ply composite patch). A final layer of resin was added to ensure the reinforcing material was encapsulated and embedded in the resin. A flat plate was used to compress the composite into the hole, force out any entrapped air, and form a smooth external surface on the composite patch.

The composites were cured for 8 minutes using an H&S Autoshop 400 watt UV-A source at a distance of 10 inches from the composite surface. The cure was performed at ambient temperature and under natural atmosphere; no vacuum bagging or reduced-oxygen environment was used. The composites exhibited complete cure with no surface tack or other interference effects due to oxygen inhibition within 8 minutes exposure to UV-A radiation.

Example 4

The composites prepared according to Example 3 were subjected to mechanical testing. Test samples were cut from the composites such that the repair junction was located approximately in the middle of the sample (i.e., a test specimen comprising a first portion comprising substrate material adhered to a second portion comprising repair composite). The mechanical tests included a three-point bend test (ASTM D790) and a tensile test (ASTM D638). The results of the mechanical testing are presented in Tables 6 and 7. The interface between the composite patch and the substrate did not show any signs of delamination or flaking, indicating good adhesion between composite and substrate.

TABLE 6

| | Material | | |
|---|---|---|---|
| | | Resin A | |
| Property | PVE | Mat A | Mat G |
| Maximum Flexural Stress (MPa) | 488.13 | 256.8 | 151.2 |
| Flexural Modulus (MPa) | 15,719 | 8,374 | 5,459 |
| Ultimate Tensile Strength (MPa) | 368.8 | 94.6 | 66.8 |

TABLE 7

| Material | UTS (MPa) | % Elongation | Young's Modulus (GPa) | Maximum Flexural Stress (MPa) | Flexural Modulus (GPa) |
|---|---|---|---|---|---|
| PVE | 368.83026 | 7.595 | 6.348687745 | 488.1328239 | 15.71925786 |
| Mat A | 87.18316451 | 3.671082428 | 5.066969975 | 162.6841228 | 7.844880338 |
| Mat G | 51.2883237 | 4.035061612 | 3.278181426 | 90.72806878 | 3.83099135 |
| Mat A repair | 32.55212086 | 1.433024677 | 4.121597233 | 83.70899693 | 3.561132442 |
| Mat G repair | 22.28311575 | 0.838996729 | 4.008493948 | 70.64809729 | 9.923556484 |

Example 5

Five (5) composites comprising a resin combined with a reinforcing material were prepared. Four resins (Resins B-E, Table 8) were combined with 543 style 7781 E-glass fiberglass fabric reinforcing material to prepare composites according to embodiments disclosed herein. A commercially available epoxy resin system (Henkel Hysol® EA 9396, Resin A, Table 8) was used with the 543 style 7781 E-glass fiberglass fabric to prepare controls for comparative purposes. The compositions of the Resins A-E are presented in Table 9.

TABLE 8

| Resin A | Henkel Hysol ® EA 9396 |
| Resin B | Baseline UV Cure System |

TABLE 8-continued

| Resin C | Adhesion Modified Baseline UV Cure |
| Resin D | Reduced Hardness UV Cure (v. 1) |
| Resin E | Reduced Hardness UV Cure (v. 2) |

TABLE 9

| Resin | Component | Composition (weight percent) | Chemical Type | Commercial Name | Supplier |
|---|---|---|---|---|---|
| A | Part A | 100.00 | Proprietary | Part A | Henkel Corporation |
|  | Part B | 30.00 | Proprietary | Part B | Henkel Corporation |
| B | Oligomer | 55.00 | aliphatic urethane acrylate | Desmolux U 680H | Bayer Material Science LLC |
|  | Oligomer | 18.00 | aliphatic urethane acrylate | Desmolux XP 2513 | Bayer Material Science LLC |
|  | Monomer | 9.00 | mixture of pentaerythritol triacrylate and pentaerythritol tetraacrylate | PETIA | Cytec Industries Inc. |
|  | Photoinitiator | 9.00 | bis(2,4,6-trimethylbenzoyl)-phenylphosphine oxide | Irgacure 2022 | Ciba Specialty Chemicals Inc. |
|  | Additive | 9.00 | gamma-methacryloxypropyltrimethoxy silane | Silquest A-174 | Momentive Performance Materials Inc. |
| C | Oligomer | 53.42 | aliphatic urethane acrylate | Desmolux U 680H | Bayer Material Science LLC |
|  | Oligomer | 17.81 | aliphatic urethane acrylate | Desmolux XP 2513 | Bayer Material Science LLC |
|  | Monomer | 7.12 | mixture of pentaerythritol triacrylate and pentaerythritol tetraacrylate | PETIA | Cytec Industries Inc. |
|  | Monomer | 7.12 | tri-functional acid ester | CD-9053 | Sartomer Co., Inc. |
|  | Photoinitiator | 7.41 | bis(2,4,6-trimethylbenzoyl)-phenylphosphine oxide | Irgacure 2022 | Ciba Specialty Chemicals Inc. |
|  | Additive | 7.12 | gamma-methacryloxypropyltrimethoxy silane | Silquest A-174 | Momentive Performance Materials Inc. |
| D | Oligomer | 53.04 | aliphatic urethane acrylate | Desmolux U 680H | Bayer Material Science LLC |
|  | Oligomer | 17.68 | aliphatic urethane acrylate | Desmolux XP 2513 | Bayer Material Science LLC |
|  | Monomer | 7.78 | tri-functional acid ester | CD-9053 | Sartomer Co., Inc. |
|  | Monomer | 7.07 | isobornyl methacrylate | SR-423A | Sartomer Co., Inc. |
|  | Photoinitiator | 7.36 | bis(2,4,6-trimethylbenzoyl)-phenylphosphine oxide | Irgacure 2022 | Ciba Specialty Chemicals Inc. |
|  | Additive | 7.07 | gamma-methacryloxypropyltrimethoxy silane | Silquest A-174 | Momentive Performance Materials Inc. |
| E | Oligomer | 17.68 | aliphatic urethane acrylate | Desmolux U 680H | Bayer Material Science LLC |
|  | Oligomer | 53.04 | aliphatic urethane acrylate | Desmolux XP 2513 | Bayer Material Science LLC |

TABLE 9-continued

| Resin Component | Composition (weight percent) | Chemical Type | Commercial Name | Supplier |
|---|---|---|---|---|
| Monomer | 7.78 | tri-functional acid ester | CD-9053 | Sartomer Co., Inc. |
| Monomer | 7.07 | isobornyl methacrylate | SR-423A | Sartomer Co., Inc. |
| Photoinitiator | 7.36 | bis(2,4,6-trimethylbenzoyl)-phenylphosphine oxide | Irgacure 2022 | Ciba Specialty Chemicals Inc. |
| Additive | 7.07 | gamma-methacryloxypropyltrimethoxy silane | Silquest A-174 | Momentive Performance Materials Inc. |

The composites were fabricated using a lay-up process to produce composite panels. A first layer of reinforcing material was saturated with resin and rolled out to remove entrapped air and wrinkles in the mat. A layer of resin was applied over the reinforcing material. A second layer of reinforcing material was applied and rolled, and the process repeated until a total of seven (7) layers of 543 style 7781 E-glass fiberglass fabric reinforcing material were encapsulated in alternating layers of resin. A final layer of resin was added to ensure the outer-most reinforcing layer was encapsulated and embedded in the resin.

The composites comprising Resins B-E were cured for 8 minutes using an H&S Autoshop 400 watt UV-A source at a distance of 8 inches from the composite surface. The cure was performed at ambient room temperature and under natural atmosphere; no vacuum bagging or reduced-oxygen environment was used. The control composites comprising the Henkel Hysol® EA 9396 epoxy system were cured according to the manufacturers instructions. The composites comprising Resins B-E exhibited complete cure with no surface tack or other interference effects due to oxygen inhibition within 8 minutes exposure to UV-A radiation.

Example 6

Figure 2:
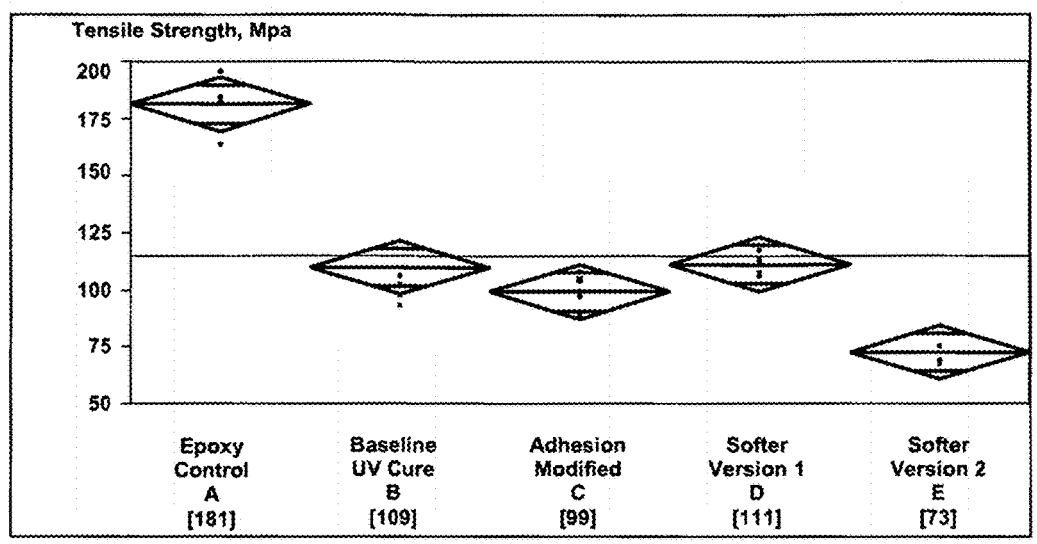
FIG. 2 is a graph presenting comparative initial tensile strength data for composites according to embodiments disclosed herein.
Figure 3:
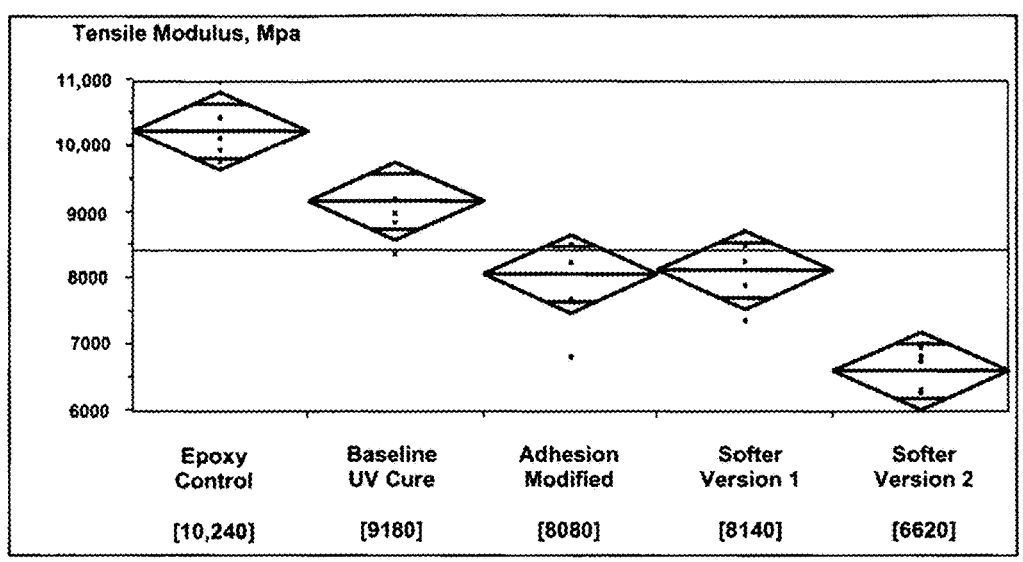
FIG. 3 is a graph presenting comparative initial tensile modulus data for composites according to embodiments disclosed herein.

Composites prepared according to Example 5 were subjected to mechanical testing. For each Resin, five (5) composite panels were fabricated and their physical properties measured. The mechanical tests included a three-point bend test (ASTM D 790) to determine the flexural strength and flexural modulus of the composites; a tensile test (ASTM D 638) to determine the ultimate tensile strength, tensile modulus, and ultimate elongation of the composites; and a hardness test (ASTM D 2240) to determine the Shore D hardness of the composites. The apparent density of the composites was also determined (ASTM D 1622). The results of the mechanical testing are presented in Table 10 and FIGS. 1-3.

TABLE 10

| Resin | Description | Rockwell Hardness (D Scale) | Density (kg/m3) |
|---|---|---|---|
| A | Epoxy Control | 87 | 1355 |
| B | Baseline UV | 84 | 1422 |
| C | Adhesion Modified | 85 | 1428 |
| D | Reduced Hardness 1 | 78 | 1349 |
| E | Reduced Hardness 2 | 73 | 1319 |

Example 7

Figure 4:
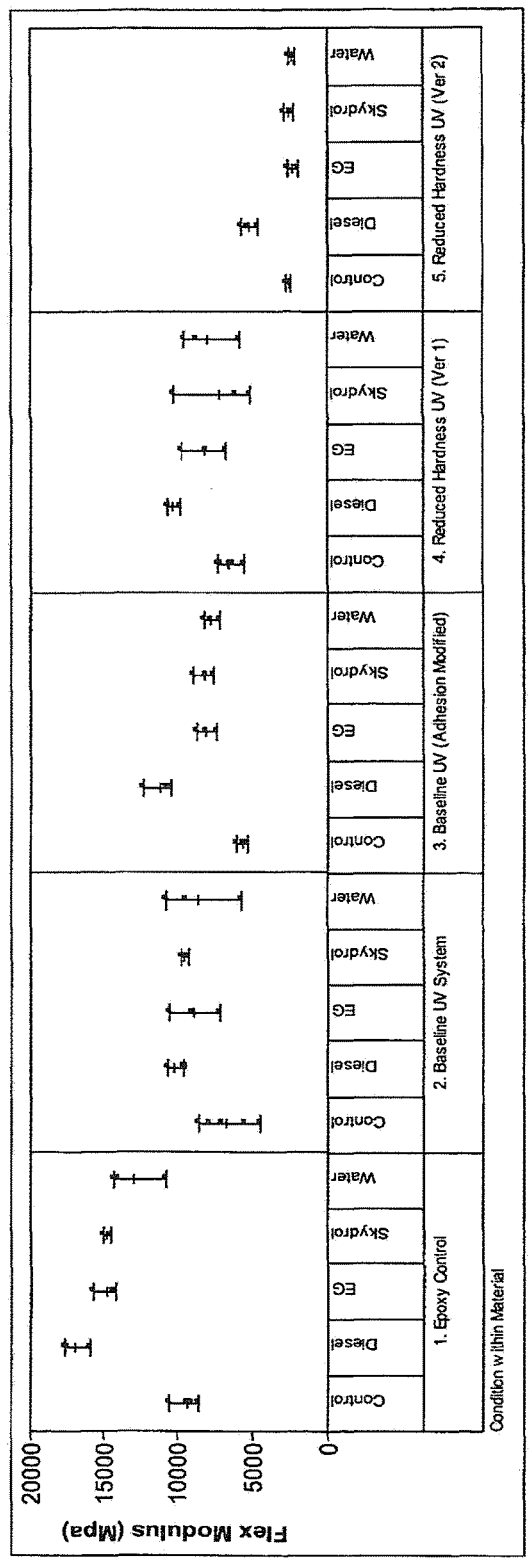
FIG. 4 presents a graph and a chart presenting comparative flexural modulus data after exposure to various solvents for composites according to embodiments disclosed herein.
Figure 5:
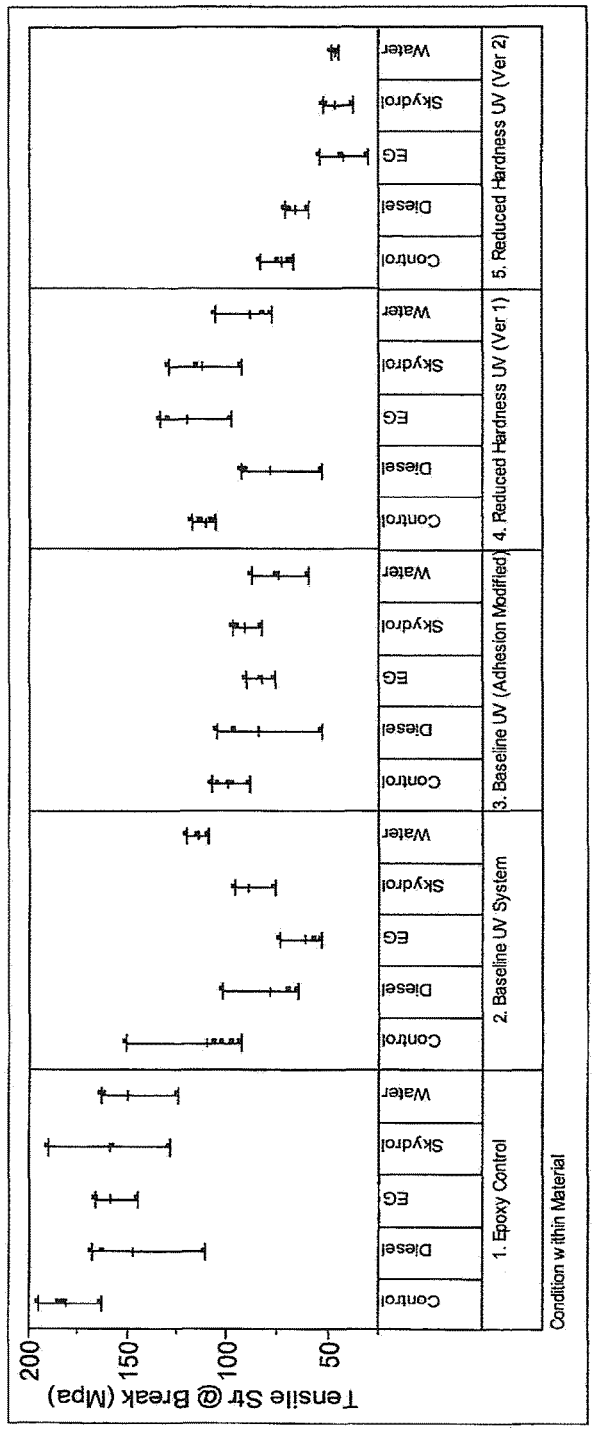
FIG. 5 presents a graph and a chart presenting comparative tensile strength data after exposure to various solvents for composites according to embodiments disclosed herein.
Figure 6:
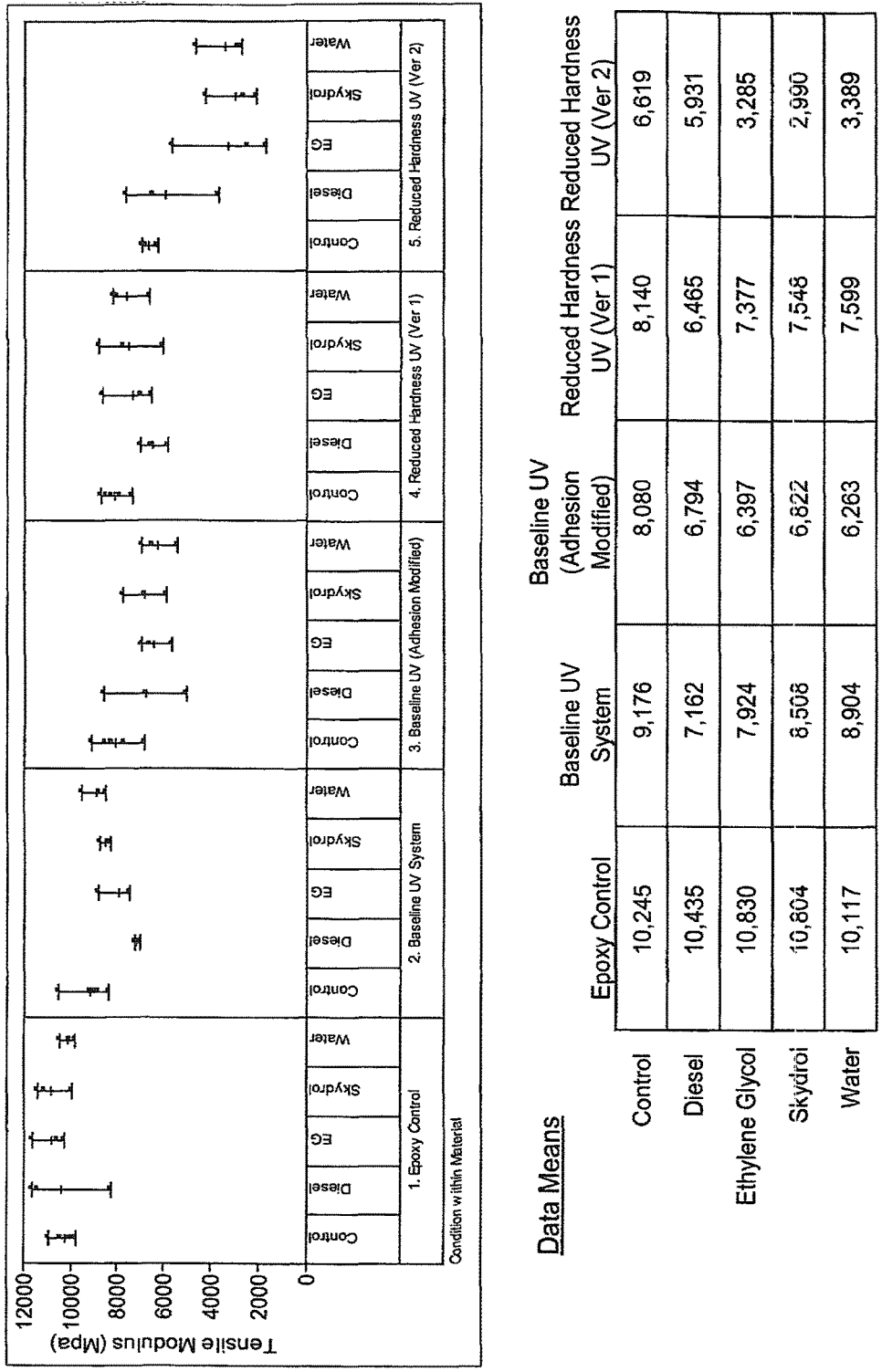
FIG. 6 presents a graph and a chart presenting comparative tensile modulus data after exposure to various solvents for composites according to embodiments disclosed herein.

The effect of solvent exposure on the physical properties of composites prepared according to Example 5 was evaluated. Three (3) samples of each composite were placed into four different solvents (water, ethylene glycol, diesel fuel, and skydrol). The composites were incubated in the solvent at room temperature for 72 hours, after which each sample was removed from the solvent, cleaned and subjected to flexural and tensile tests. The results of the solvent exposure tests are presented in FIGS. 4-6.

Example 8

A lap shear test was performed to assess the adhesion performance of composites prepared according to Example 5. The composites were fabricated using a lay-up process over aluminum substrates to produce composite panels. A first layer of reinforcing material was saturated with resin and rolled out onto an aluminum substrate to remove entrapped air and wrinkles in the mat. A layer of resin was applied over the reinforcing material. A second layer of reinforcing material was applied and rolled, and the process repeated until a total of seven (7) layers of 543 style 7781 E-glass fiberglass fabric reinforcing material were encapsulated in alternating layers of resin. A final layer of resin was added to ensure the outer-most reinforcing layer was encapsulated and embedded in the resin.

The composites comprising Resins B-E were cured for 8 minutes using an H&S Autoshop 400 watt UV-A source at a distance of 8 inches from the composite surface. The cure was performed at ambient temperature and under natural atmosphere; no vacuum bagging or reduced-oxygen environment was used. The control composites comprising the Henkel Hysol® EA 9396 epoxy system were cured according to the manufacturers instructions. The composites comprising Resins B-E exhibited complete cure with no surface tack or other interference effects due to oxygen inhibition within 8 minutes exposure to UV-A radiation. The composites strongly adhered to the aluminum substrates.

Figure 7:
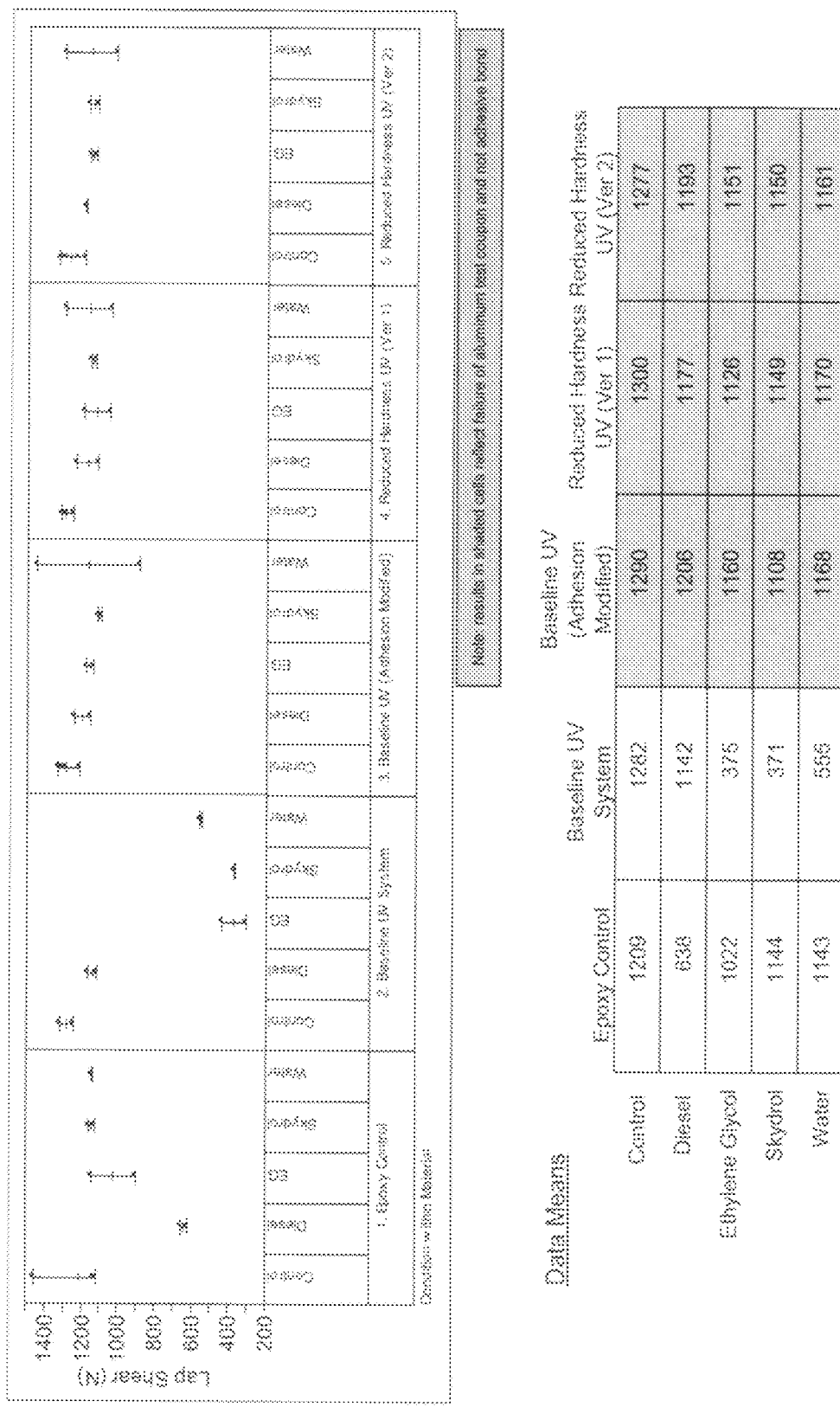
FIG. 7 presents a graph and a chart presenting data from lap shear adhesion tests of composites according to embodiments disclosed herein after exposure to various solvents.

Test samples were cut from the aluminum substrate/composite lay-ups and placed into a tensile test apparatus. Tensile load was applied until failure occurred. The lap shear adhesion data obtained from the testing represents the force required to initiate failure (Control, FIG. 7).

Example 9

The effect of solvent exposure on the lap shear adhesion data of composites prepared according to Example 5 was evaluated. Samples of each aluminum substrate/composite lay-up were placed into four different solvents (water, ethylene glycol, diesel fuel, and skydrol). The composites were incubated in the solvent at room temperature for 72 hours, after which each sample was removed from the solvent, cleaned and subjected to tensile testing. The results of the solvent exposure lap shear adhesion tests are presented in FIG. 7.

Example 10

Figure 8:
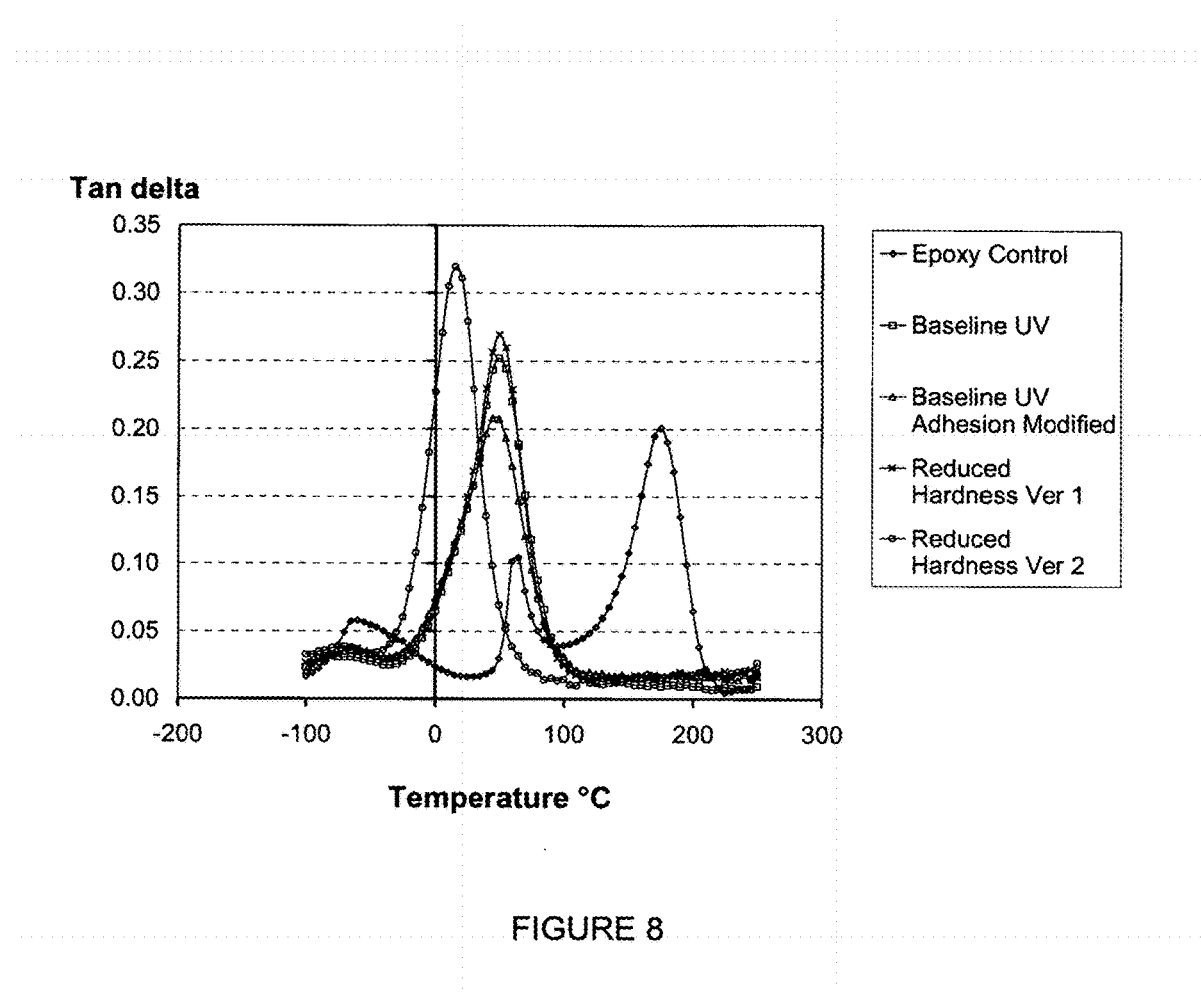
FIG. 8 is a graph presenting Dynamic Mechanical Analysis data of composites according to embodiments disclosed herein in an un-aged condition.
Figure 9:
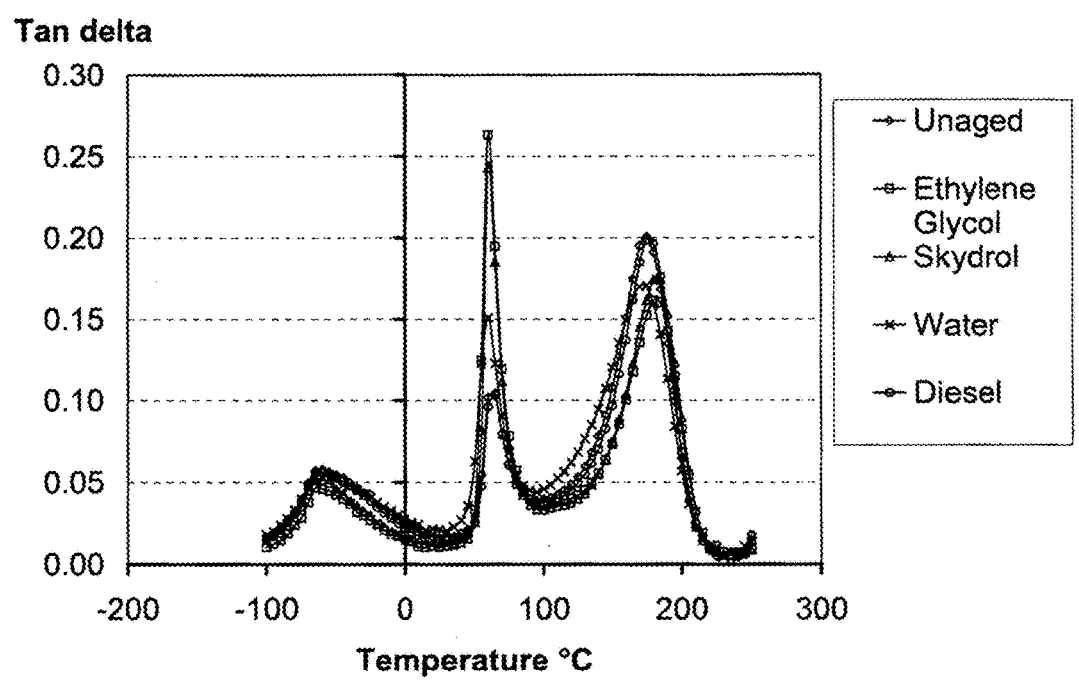
FIG. 9 is a graph presenting Dynamic Mechanical Analysis data of an epoxy (Henkel Hysol® EA 9396) control composite after exposure to various solvents.
Figure 10:
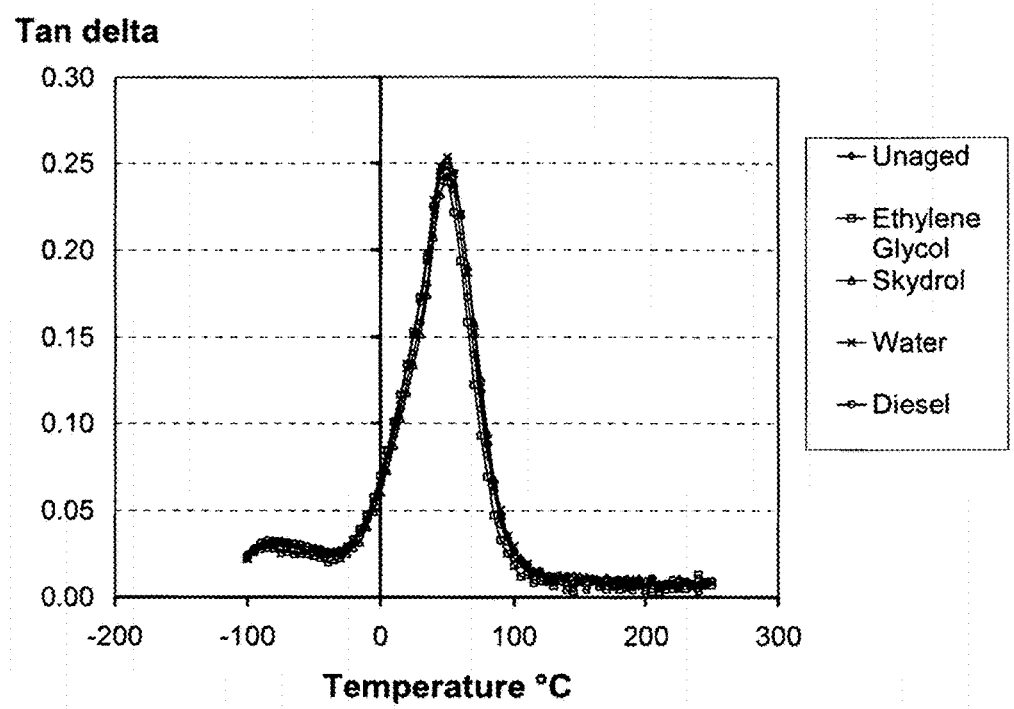
FIG. 10 is a graph presenting Dynamic Mechanical Analysis data of a composite according to embodiments disclosed herein after exposure to various solvents.
Figure 11:
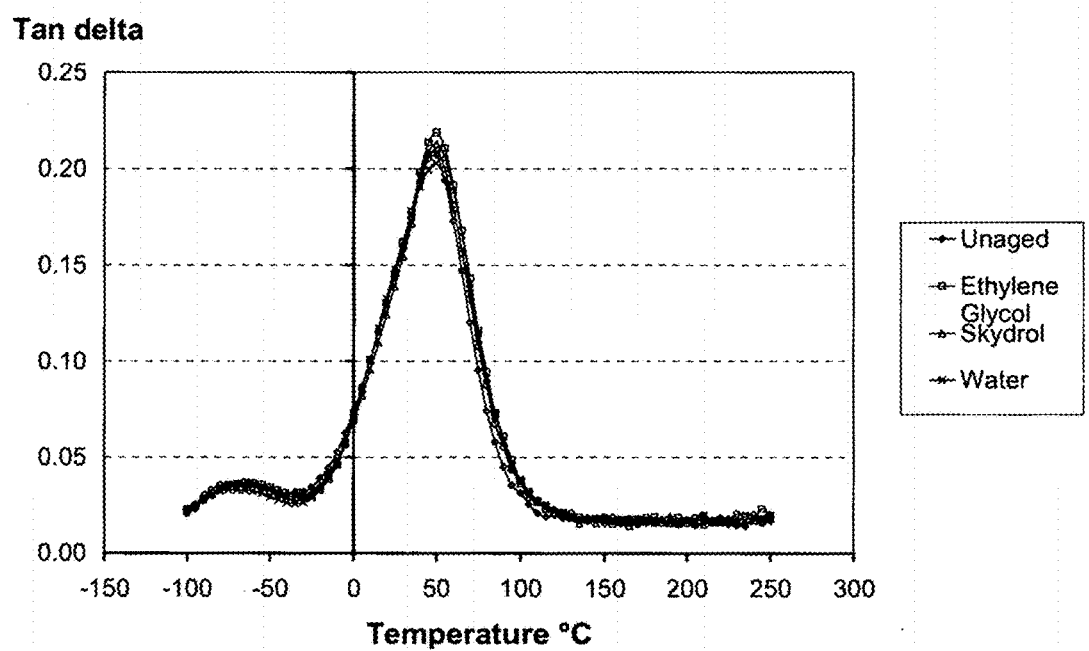
FIG. 11 is a graph presenting Dynamic Mechanical Analysis data of a composite according to embodiments disclosed herein after exposure to various solvents.
Figure 12:
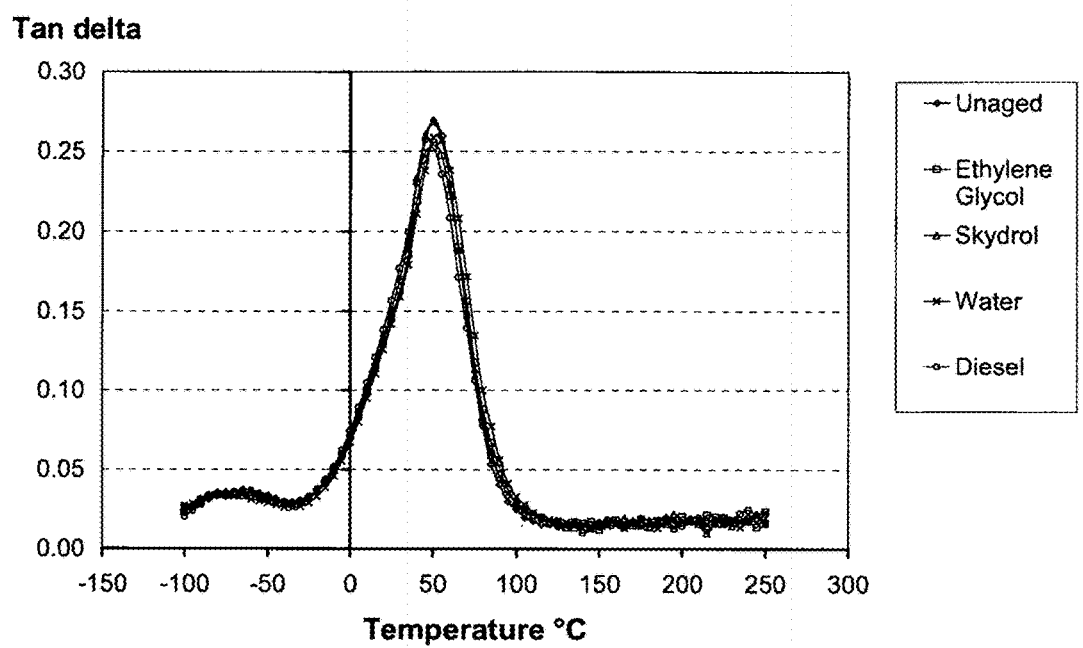
FIG. 12 is a graph presenting Dynamic Mechanical Analysis data of a composite according to embodiments disclosed herein after exposure to various solvents.
Figure 13:
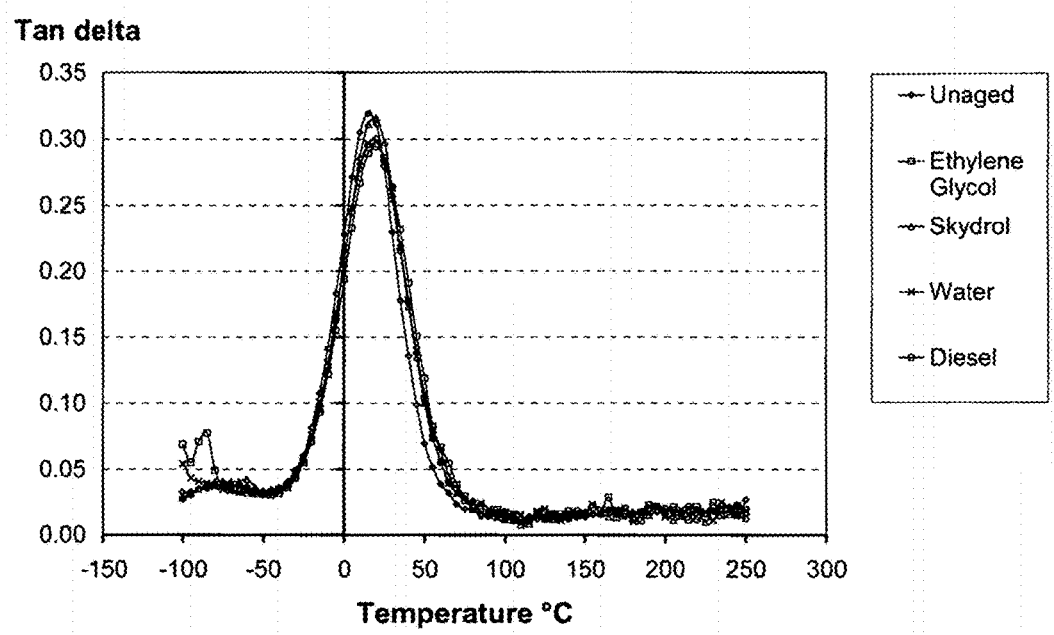
FIG. 13 is a graph presenting Dynamic Mechanical Analysis data of a composite according to embodiments disclosed herein after exposure to various solvents.

Composites prepared according to Example 5 were subjected to Dynamic Mechanical Analysis (DMA) using an ARES DMA instrument according to ASTM D7028-07e1: Standard Test Method for Glass Transition Temperature (DMA Tg) of Polymer Matrix Composites by Dynamic Mechanical Analysis (DMA) (ISO-6721). The results of the DMA are presented in FIGS. 8-13. FIG. 8 is a graph presenting the DMA data of the composites in an un-aged condition. FIG. 9 is a graph presenting the DMA data of the epoxy (Henkel Hysol® EA 9396) control composite after exposure to the solvents. FIG. 10 is a graph presenting the DMA data of the Baseline UV Cure composite after exposure to the solvents. FIG. 11 is a graph presenting the DMA data of the Adhesion Modified Baseline UV Cure composite after exposure to the solvents. FIG. 12 is a graph presenting the DMA data of the Reduced Hardness UV Cure (v. 1) composite after exposure to the solvents. FIG. 13 is a graph presenting the DMA data of the Reduced Hardness UV Cure (v. 2) composite after exposure to the solvents.

Example 11

Two composites comprising a resin combined with a reinforcing material were prepared according to embodiments disclosed herein. The resin formulation is presented in Table 11 and the reinforcing materials were a 4 ounce plain weave fiberglass fabric and a 543 style 7781 E-glass fiberglass fabric.

TABLE 11

| Component | Composition (weight percent) | Chemical Type | Commercial Name | Supplier |
|---|---|---|---|---|
| Oligomer | 54.91 | aliphatic urethane acrylate | Desmolux VP LS 2308 | Bayer Material Science LLC |
| Oligomer | 18.30 | aliphatic urethane acrylate | Desmolux XP 2513 | Bayer Material Science LLC |
| Monomer | 9.15 | mixture of pentaerythritol triacrylate and pentaerythritol tetraacrylate | PETIA | Cytec Industries Inc. |
| Photoinitiator | 8.82 | bis(2,4,6-trimethylbenzoyl)-phenylphosphine oxide | Irgacure 2022 | Ciba Specialty Chemicals Inc. |
| Additive | 8.82 | gamma-methacryloxypropyltrimethoxy silane | Silquest A-174 | Momentive Performance Materials Inc. |

Rectangular open-faced molds (6 inch×6 inch×⅛ inch) were used to fabricate the composites in order to provide consistent volume and thickness among each composite. The reinforcing material was cut to a rectangular size that approximately matched the 6 inch×6 inch area of the mold. The resin was prepared by mixing the resin components according to the weight percentages presented in Table 11. A layer of resin was spread on the bottom of the mold. A first layer of reinforcing material was laid over the resin and an additional layer of resin was applied over the reinforcing material. A roller was used to saturate the reinforcing material with resin and to remove entrapped air from the composite. A second layer of reinforcing material was applied and the process repeated to produce a composite comprising 10 layers of reinforcing material. A final layer of resin was added to ensure the reinforcing material was encapsulated and embedded in the resin. A glass plate was placed over the mold and composite and hand pressure was applied to the glass surface until the glass plate reached the top surface of the mold (the composite was compressed in between the bottom and sides of the mold and the bottom surface of the glass plate).

The composites were cured for 8 minutes using an H&S Autoshop 400 waft UV-A source at a distance of 10 inches from the top surface of the glass plate. The cure was performed at ambient temperature and under natural atmosphere; no vacuum bagging or reduced-oxygen environment was used other than the glass plate positioned on the mold surface, in between the composite and the UV-A source. The composites exhibited complete cure with no surface tack or other interference effects due to oxygen inhibition within 8 minutes exposure to UV-A radiation through the glass plate. The composites comprised an even, smooth and planar external surface.

Example 12

Composites prepared according to Example 11 were subjected to mechanical testing. The mechanical tests included a three-point bend test (ASTM D790) to determine the flexural strength and flexural modulus of the composites; a tensile test (ASTM D638) to determine the ultimate tensile strength, tensile modulus, and ultimate elongation of the composites; and a hardness test (ASTM D2240) to determine the Shore D hardness of the composites. The apparent density of the composites was also determined (ASTM D1622). The results of the mechanical testing are presented in Table 12.

TABLE 12

| Physical Property | Composite with 543 style 7781 E-glass | Composite with 4 ounce plain weave |
|---|---|---|
| Specific Gravity (lb/ft3) | 94.16 | 82.24 |
| Hardness, Shore D @ 1 | 90 | 87 |
| Flexural Modulus (MPa) | 8295.8 | 5107 |
| Tensile Strength @ Break | 164.94 | 117.34 |

TABLE 12-continued

| Physical Property | Composite with 543 style 7781 E-glass | Composite with 4 ounce plain weave |
|---|---|---|
| Elongation @ Break (%) | 1.88 | 1.9 |
| Tensile Modulus (MPa) | 10601.2 | 7527.6 |

Example 13

A composite according to embodiments disclosed herein was tested as a repair patch on a polyvinylester (PVE) fiberglass composite substrate. PVE substrate material was obtained from Seeman's Composites and contained a 3/1 coarse, twill weave fiberglass with an approximate weight of 22 ounces. The substrate material was damaged by cutting a 3 inch diameter hole into the material. The edges of the hole were tapered inward, sanded, and cleaned of debris. The composite comprised the resin formulation is presented in Table 11 and the reinforcing material was 543 style 7781 E-glass fiberglass fabric.

A lay-up process was used to repair the hole. A backing plate was placed behind the damaged substrate to ensure a flat surface in the bottom of the hole. A layer of resin was spread on the bottom and sides of the hole. A first layer of reinforcing material was laid over the resin and an additional layer of resin was applied over the reinforcing material. A roller was used to saturate the reinforcing material with resin and to remove entrapped air from the composite. A second layer of reinforcing material was applied and the process repeated. A composite comprising six (6) reinforcing layers (6-ply composite patch) was produced. A final layer of resin was added to ensure the reinforcing material was encapsulated and embedded in the resin. A flat polycarbonate plate was used to compress the composite into the hole, force out any entrapped air, and form a smooth external surface on the composite patch.

The composite was cured through the polycarbonate plate for 8 minutes using an H&S Autoshop 400 watt UV-A source at a distance of 10 inches from the top surface of the polycarbonate plate. The cure was performed at ambient temperature and under natural atmosphere; no vacuum bagging or reduced-oxygen environment was used other than the polycarbonate plate positioned on the substrate surface, in between the composite patch and the UV-A source. The composite exhibited complete cure with no surface tack or other interference effects due to oxygen inhibition within 8 minutes exposure to UV-A radiation through the polycarbonate plate. The composite patch comprised an even, smooth and planar external surface.

The present invention has been described with reference to certain exemplary and illustrative embodiments. However, it will be recognized by persons having ordinary skill in the art that various substitutions, modifications or combinations of any of the exemplary embodiments (or portions thereof) may be made without departing from the scope of the invention. Thus, the invention is not limited by the description of the exemplary and illustrative embodiments, but rather by the claims.

What is claimed is:

1. A process for forming a reinforced UV-A curable composite on a substrate, the process comprising:
   applying to a substrate at least one reinforcing layer and at least one resin layer to form the composite, the resin comprising at least one urethane acrylate oligomer, at least one polyfunctional acrylate monomer, and at least one photoinitiator;
   exposing the composite to UV-A radiation; and
   completely curing the composite within 10 minutes of exposure to UV-A radiation;
   wherein the UV-A curable composite has a thickness of at least 125 mils;
   wherein the process is performed without creating a vacuum.

2. The process of claim 1, wherein the composite is completely cured within 8 minutes of exposure to UV-A radiation.

3. The process of claim 1, comprising applying a plurality of alternating fiberglass reinforcing layers and resin layers to the substrate to form the composite.

4. The process of claim 3, wherein the fiberglass comprises style 7781 E-glass.

5. The process of claim 1, wherein the photoinitiator comprises bis(2,4,6-trimethylbenzoyl)-phenylphosphine oxide, 2-hydroxy-2-methyl-1-phenyl-propan-1-one, or a combination thereof.

6. The process of claim 1, wherein the polyfunctional acrylate monomer is selected from the group consisting of ethylene glycol di(meth)acrylate; dipropylene glycol diacrylate; hexanediol di(meth)acrylate; triethylene glycol di(meth)acrylate; tetraethylene glycol di(meth)acrylate; trimethylolpropane tri(meth)acrylate; ethoxylated trimethylolpropane tri(meth)acrylate; glycerol tri(meth) acrylate; pentaerythritol tri(meth)acrylate; pentaerythritol tetra(meth)acrylate; neopentylglycol di(meth)acrylate, isobornyl (meth)acrylate and combinations of any thereof.

7. The process of claim 1, wherein the silane acrylate comprises gamma-methacryloxypropyltrimethoxy silane.

8. The process of claim 1, wherein the at least one urethane acrylate oligomer comprises a reaction product of an aliphatic polyisocyanate and a hydroxyfunctional acrylate.

9. The process of claim 8, wherein the aliphatic polyisocyanate comprises at least one functional group selected from the group consisting of isocyanurate, uretdione, allophanate, biuret, and combinations of any thereof.

10. The process of claim 8, wherein the hydroxy-functional acrylate comprises a hydroxyalkyl ester of (meth) acrylic acid, a reaction product of a lactone and a hydroxyalkyl ester of (meth)acrylic acid, or a combination thereof.

11. The process of claim 1, wherein the substrate comprises a damaged substrate having a hole therein, and wherein the composite is applied to the substrate to fill the hole and cured, thereby repairing the damage.

12. The process of claim 1, further comprising applying a substantially transparent plate to the composite and the substrate, and exposing the composite to UV-A radiation through the substantially transparent plate.

13. The process according to claim 1, wherein at least four reinforcing layers and at least four resin layers were applied to the substrate.

14. The process according to claim 1, wherein the UV-A curable composite has a thickness of 125-3,000 mils.

15. The process according to claim 14, wherein the resin further comprises silane acrylate.

16. The process according to claim 15, wherein the photoinitiator comprises bis(2,4,6-trimethylbenzoyl)-phenylphosphine oxide.

17. The process according to claim 16, wherein the resin comprises from 30% to 75% of urethane acrylate oligomer, from 5% to 70% polyfunctional acrylate monomer, from 3% to 9% photoinitiator and from 5% to 10% silane acrylate based on the total weight of the resin.

18. The process according to claim 16, wherein the resin comprises from 60% to 75% urethane acrylate oligomer, from 9% to 15% polyfunctional acrylate monomer, from 7% to 9% photoinitiator and from 7% to 9% silane acrylate based on the total weight of the resin.

* * * * *